United States Patent
Matsushita et al.

(10) Patent No.: US 9,780,611 B2
(45) Date of Patent: Oct. 3, 2017

(54) ROTARY ELECTRIC MACHINE USING PERMANENT MAGNET

(71) Applicants: Kabushiki Kaisha Toshiba, Tokyo (JP); Toshiba Industrial Products and Systems Corporation, Kanagawa (JP)

(72) Inventors: Makoto Matsushita, Tokyo (JP); Norio Takahashi, Kanagawa (JP); Daisuke Misu, Tokyo (JP); Katsutoku Takeuchi, Kanagawa (JP); Yutaka Hashiba, Kanagawa (JP); Masayuki Kawakami, Kanagawa (JP); Takashi Araki, Mie (JP); Yuji Yamamoto, Gifu (JP); Hisami Katsurayama, Mie (JP)

(73) Assignees: KABUSHIKI KAISHA TOSHIBA, Tokyo (JP); TOSHIBA INDUSTRIAL PRODUCTS AND SYSTEMS CORPORATION, Kanagawa (JP)

( * ) Notice: Subject to any disclaimer, the term of this patent is extended or adjusted under 35 U.S.C. 154(b) by 0 days.

(21) Appl. No.: 14/952,063

(22) Filed: Nov. 25, 2015

(65) Prior Publication Data

US 2016/0087495 A1 Mar. 24, 2016

Related U.S. Application Data

(63) Continuation of application No. PCT/JP2014/063810, filed on May 26, 2014.

(30) Foreign Application Priority Data

May 31, 2013 (JP) .................. 2013-116294

(51) Int. Cl.
*H02K 21/12* (2006.01)
*H02K 1/27* (2006.01)
*H02K 21/14* (2006.01)

(52) U.S. Cl.
CPC .......... *H02K 1/276* (2013.01); *H02K 1/2766* (2013.01); *H02K 21/14* (2013.01); *H02K 2213/03* (2013.01)

(58) Field of Classification Search
CPC .................. H02K 1/12; H02K 1/27
(Continued)

(56) References Cited

U.S. PATENT DOCUMENTS

2002/0109429 A1 8/2002 Hattori et al.
2008/0093944 A1 4/2008 Takahashi et al.
(Continued)

FOREIGN PATENT DOCUMENTS

CN 101138145 A 3/2008
CN 102545421 A 7/2012
(Continued)

OTHER PUBLICATIONS

International Search Report and Written Opinion issued in related PCT Application No. PCT/JP2014/063810 mailed Jul. 29, 2014 (9 pages).
(Continued)

*Primary Examiner* — Jose Gonzalez Quinones
(74) *Attorney, Agent, or Firm* — Baker Botts L.L.P.

(57) ABSTRACT

A permanent magnet type rotary electric machine has a stator, a rotor which is rotatably provided inside the stator, and permanent magnets arranged in a rotor core of the rotor. An angle θ between a straight line connecting the center of the rotor to a middle position between two permanent magnets arranged in the V shape, and a straight line connecting the center of the rotor to an outer circumferential top of one of the permanent magnets has the relation: $0.65 < \Theta (=\theta/(180/P)) < 0.80$ in which P is the number of poles in the rotor. When a rear depth of a slot of the stator core is D, and a burying depth of the permanent magnet in the radial
(Continued)

direction of the rotor core is t, D/t=A has the relation: 0.8<A<1.1.

5 Claims, 5 Drawing Sheets

(58) Field of Classification Search
USPC ............ 310/156.01, 156.44, 156.48, 156.53, 310/156.56
See application file for complete search history.

(56) References Cited

U.S. PATENT DOCUMENTS

| | | | |
|---|---|---|---|
| 2008/0224558 A1* | 9/2008 | Ionel .................... | H02K 1/2766 310/156.57 |
| 2008/0258573 A1* | 10/2008 | Kamiya .................. | B60K 6/26 310/156.02 |
| 2010/0026128 A1* | 2/2010 | Ionel ...................... | H02K 1/276 310/156.53 |
| 2010/0033051 A1 | 2/2010 | Takabatake et al. | |
| 2010/0308686 A1* | 12/2010 | Mathoy ................. | H02K 1/246 310/216.106 |
| 2012/0200193 A1 | 8/2012 | Sano et al. | |
| 2013/0106228 A1 | 5/2013 | Aoyama | |

FOREIGN PATENT DOCUMENTS

| | | | |
|---|---|---|---|
| CN | 102629788 A | | 8/2012 |
| JP | 2006217798 A | * | 8/2006 |
| JP | 2006254629 A | | 9/2006 |
| JP | 2006254639 A | | 9/2006 |
| JP | 2008245336 A | | 10/2008 |
| JP | 2010068605 A | | 3/2010 |
| JP | 2011050216 A | * | 3/2011 |
| JP | 2012161226 A | * | 8/2012 |
| JP | 2012165481 A | * | 8/2012 |
| JP | 2012227993 A | | 11/2012 |
| WO | 2006/095887 A1 | | 9/2006 |
| WO | 2012/008012 A1 | | 1/2012 |
| WO | 2012/141085 A1 | | 10/2012 |

OTHER PUBLICATIONS

International Preliminary Report on Patentability issued in related PCT application No. PCT/JP2014/063810, mailed Dec. 10, 2015 (7 pages).
Search Report issued in related European Application No. 14804476.1, mailed Dec. 23, 2016 (6 pages).
Office Action issued in related CN Application No. 201480031017.1, dated Apr. 27, 2017 (8 pages).

* cited by examiner

ROTARY ELECTRIC MACHINE USING PERMANENT MAGNET

CROSS REFERENCE TO RELATED APPLICATIONS

This application is a Continuation Application of PCT Application No. PCT/JP2014/063810, filed May 26, 2014 and based upon and claiming the benefit of priority from Japanese Patent Application No. 2013-116294, filed May 31, 2013, the entire contents of all of which are incorporated herein by reference.

FIELD

An embodiment of the present invention relates to a rotary electric machine in which a permanent magnet is buried in a rotor.

BACKGROUND

From the point of view of the prevention of global warming and energy saving, efficiency regulation (top runner regulation) of three-phase induction motors which account for 80% of the market of electric motors (capacity base, production statistics 2008 by Ministry of Economy, Trade and Industry) is carried out. The efficiency of the three-phase induction motors is provided in JIS C43034-30 (IEC60034-30) as IE1 (standard efficiency), IE2 (high efficiency), and IE3 (premium efficiency). In the present situation, most of shipments are graded IE1, and are regulated to switch to IE3.

Mounting dimensions (frame numbers) of the three-phase induction motors are provided in JIS C 4210, and users/manufacturers (e.g. equipment manufacturers) design equipment accordingly. Therefore, products compatible with the current products are required.

In pursuit of further energy saving, IE4 (super premium efficiency) is to be provided. IE4 is difficult for the three-phase induction motors to achieve, so that synchronous motors using permanent magnets (which may be hereinafter referred to as permanent magnet type rotary electric machines) are used to improve efficiency.

CITATION LIST

Patent Literature

Patent Literature 1: Jpn. Pat. Appln. KOKAI Publication No. 2012-227993

SUMMARY OF INVENTION

The permanent magnet type rotary electric machines of the IE4 efficiency as well as products of the IE3 efficiency need to keep compatible with the current products and also achieve the IE4 efficiency. That is, it is necessary to contrive the shapes of rotors (e.g. locations of magnets) while using the shapes (outer shapes) of the current frames and stator cores. Rare-earth neodymium magnets including rare earth are used as permanent magnets for desired performance, so that their amount of use needs to be reduced.

That is, the challenge is to provide a permanent magnet type rotary electric machine which reduces the amount of use of the permanent magnet and also achieves higher efficiency (smaller loss).

According to one embodiment, a permanent magnet type rotary electric machine has a stator having an armature coil, a rotor which is rotatably provided inside the stator and which has a rotor core, and permanent magnets arranged in a V shape in the rotor core to counteract a magnetic flux from the armature coil which passes between adjacent magnetic poles of the rotor. An angle θ between a straight line connecting the center of the rotor to a middle position between two permanent magnets arranged in the V shape, and a straight line connecting the center of the rotor to an outer circumferential top of one of the permanent magnets has the relation: $0.65 < \Theta(=\theta/(180/P)) < 0.80$ in which P is the number of poles in the rotor. When a rear depth of a slot of the stator core is D, and a burying depth of the permanent magnet in the radial direction of the rotor core is t, $D/t = A$ has the relation: $0.8 < A < 1.1$.

Advantageous Effects of Invention

It is possible to provide a permanent magnet type rotary electric machine which reduces the amount of use of a permanent magnet and also achieves higher efficiency (smaller loss).

DETAILED DESCRIPTION

Hereinafter, an embodiment will be described with reference to the drawings. Each of the drawings is a schematic diagram showing the embodiment and assists in its understanding, and the shapes, dimensions, and ratios therein are different in some parts from those in an actual apparatus.

However, these can be suitably modified in design by reference to the following explanations and known arts.

First Embodiment

Figure 1:
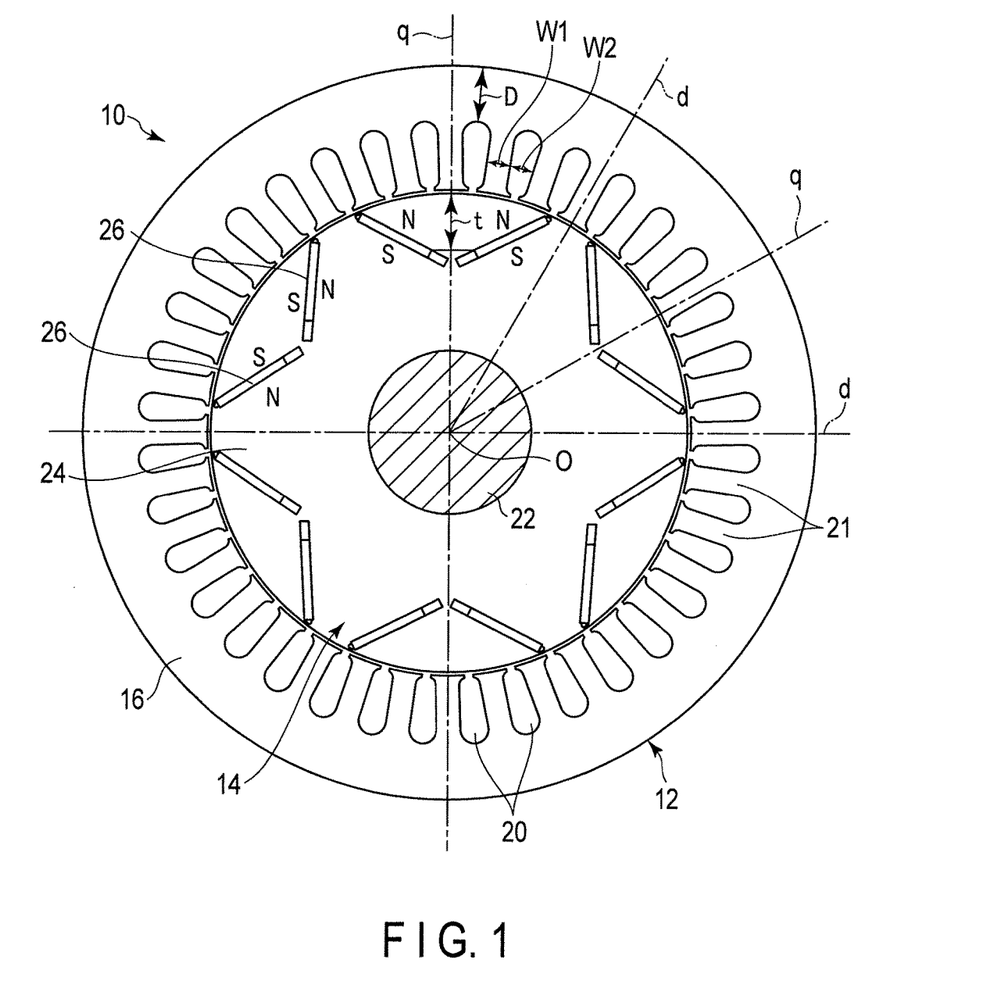
FIG. 1 is a sectional view showing a permanent magnet type rotary electric machine according to a first embodiment.
Figure 2:
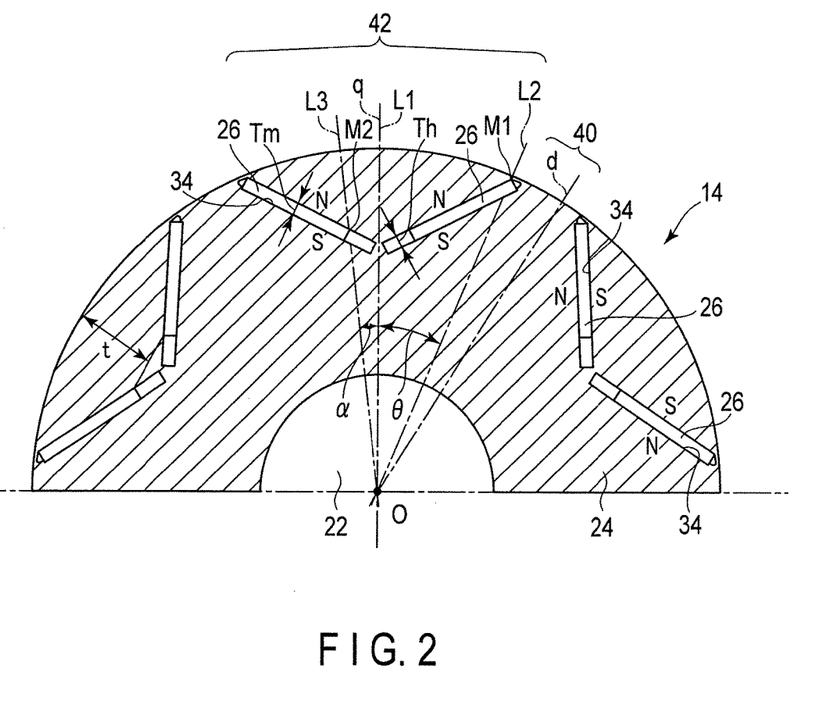
FIG. 2 is a partially enlarged sectional view showing a rotor of the permanent magnet type rotary electric machine according to the first embodiment.

FIG. 1 shows a permanent magnet type reactance rotary electric machine 10 (here, referred to as a rotary electric machine 10) according to the first embodiment. FIG. 2 is an enlarged sectional view showing a rotor 14 incorporated in the rotary electric machine 10 in FIG. 1.

As shown in FIG. 1, the rotary electric machine 10 is, for example, an inner rotor type rotary electric motor, and comprises an annular (in the present embodiment, circular cylindrical) stator 12 supported by an unshown fixing frame, and the rotor 14 which is supported rotatably inside the stator 12 and coaxially with the stator 12.

The stator 12 comprises a circular cylindrical stator core 16, and an unshown armature coil buried in the stator core 16. The stator core 16 has a structure in which a large number of magnetic materials such as circular-ring electromagnetic copper plates are concentrically stacked. Slots 20 each extending in the axial direction are formed in the inner circumferential part of the stator core 16. Thus, a large number of stator teeth 21 facing the rotor 14 are provided in the inner circumferential part of the stator core 16. The armature coil is buried in the slots 20. In the present embodiment, the number of the slots 20 of the stator core 16 is 36. The number of the slots 20 of the stator core 16 is not limited thereto, and may be a multiple of 18 such as 54, 72, or 90.

As shown in FIG. 1 and FIG. 2, the rotor 14 has a rotation shaft 22 having both ends rotatably supported by unshown bearings, a circular cylindrical rotor core 24 fixed to substantially the axial center of the rotation shaft 22, and (in the present embodiment, twelve) permanent magnets 26 buried in the rotor core 24. The rotor 14 is coaxially located inside the stator 12 across a slight space.

The rotor core 24 has a structure in which a large number of magnetic materials such as circular-ring electromagnetic copper plates 24a are concentrically stacked. The rotor core 24 has radially extending magnetization easy axes d (parts where magnetic fluxes easily pass), and radially extending magnetization hard axes q (parts where magnetic fluxes do not easily pass). These d-axes and q-axes are provided alternately in the circumferential direction of the rotor core 24 and in predetermined phases.

Two magnet burying holes 34 are formed at both ends of each of the q-axes. In the present embodiment, the rotor core 24 has 6 magnetic poles (P=6), and has 12 magnet burying holes 34. Each of the magnet burying holes 34 extends through the rotor core 24 in the axial direction.

Attention is focused on a pair of magnet burying holes 34 at both ends of one q-axis. When seen in a plane that intersects at right angles with the central axis of the rotor core 24, two magnet burying holes 34 are provided side by side substantially in a V shape. More specifically, the inner circumferential ends of two magnet burying holes 34 close to the rotation shaft 22 face close to each other across the q-axis, and the outer circumferential ends of the two magnet burying holes 34 close to the circumference of the rotor core 24 are located apart from each other in the circumferential direction.

The permanent magnets 26 are inserted in the respective magnet burying holes 34, and buried in the rotor core 24. Each of the permanent magnets 26 is in the form of, for example, an axially elongated rod having a flat rectangular section, and has a length substantially equal to the axial length of the rotor core 24. That is, each of the permanent magnets 26 extends substantially over the entire axial length of the rotor core 24.

Two permanent magnets 26 located on both ends of each of the q-axes are also located side by side substantially in the V shape depending on the layout of the above-mentioned magnet burying holes 34. Each of the permanent magnets 26 is magnetized in the thickness direction. Regarding two permanent magnets 26 located on both sides of each of the q-axes, components in the direction of each of the q-axes in the magnetization direction are in the same direction. Regarding two permanent magnets 26 located on both sides of each of the d-axes, components in the direction of each of the d-axes in the magnetization direction are in the opposite direction.

The permanent magnets 26 are arranged as described above, so that a region on each of the d-axes functions as a magnetic pole portion 40 in the outer circumferential part of the rotor core 24, and a region on each of the q-axes functions as an inter-magnetic pole portion 42. In other words, the permanent magnet 26 and the magnet burying hole 34 in the rotor core 24 are arranged in the V shape to counteract the magnetic flux from the armature coil which passes between the magnetic poles of the rotor core 24.

According to the rotary electric machine 10 having the configuration described above, when electricity is applied to the armature coil, the rotor 14 rotates around the rotation shaft 22 due to an interaction between a rotating magnetic field generated from the armature coil and a magnetic field generated by the permanent magnet 26.

Figure 3:
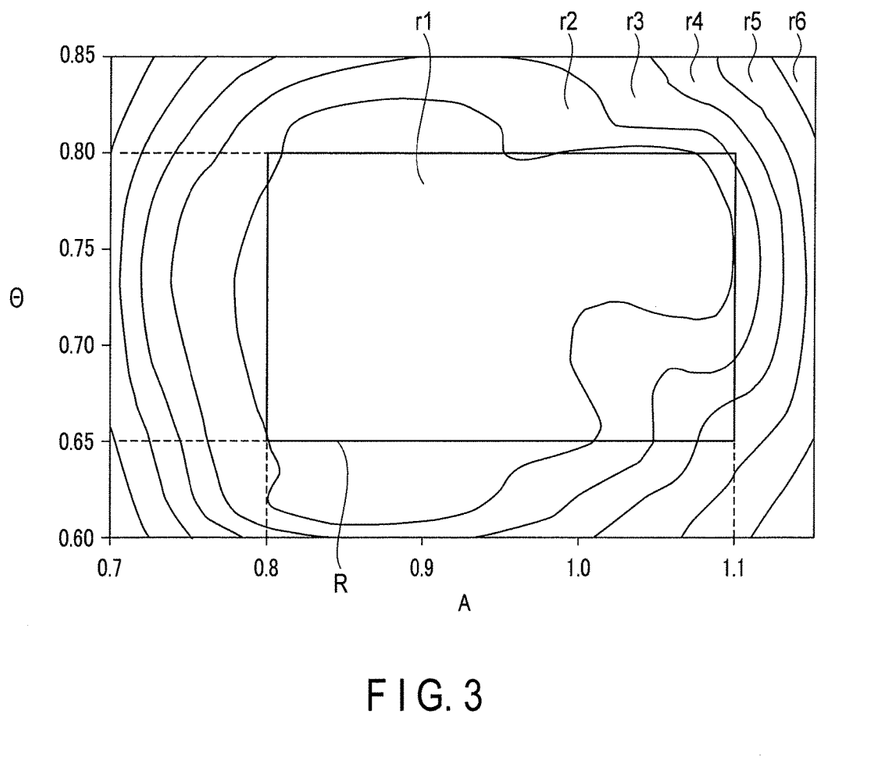
FIG. 3 is a characteristic diagram showing the relation between the position of an outer circumferential top of a magnet insertion hole provided in the rotor of the permanent magnet type rotary electric machine according to the first embodiment, a ratio A between a rear depth D of a slot of a stator core and a magnet burying depth t, and an efficiency normalized value×a torque normalized value.

FIG. 3 is a characteristic diagram in which the efficiency and torque of the rotary electric machine are normalized, and the value of an efficiency normalized value×a torque normalized value is represented by θ and A. This characteristic diagram is created by an analytic result of a situation in which test motors having different parameters for the stator 12 and the rotor 14 of the rotary electric machine 10 according to the present embodiment are prepared and operated.

θ is an angle (opening angle of the magnets) between a straight line L1 connecting a center O of the rotor 14 to a middle position between two permanent magnets 26 arranged in the V shape as shown in FIG. 2, and a straight line L2 connecting the center O of the rotor 14 to an outer circumferential top M1 of one of the permanent magnets 26. A is the value of D/t in which D is the rear depth of the slot 20 of the stator core 16, and t is a burying depth of the permanent magnet 26 in the radial direction of the rotor core 24, as shown in FIG. 1. In FIG. 3, r1 indicates a region in which the efficiency normalized value×the torque normalized value is 1.00 or more, r2 indicates a region in which the efficiency is 0.98 to 1.00, r3 indicates a region in which the efficiency is 0.96 to 0.98, r4 indicates a region in which the efficiency is 0.94 to 0.96, r5 indicates a region in which the efficiency is 0.92 to 0.94, and r6 indicates a region in which the efficiency is 0.90 to 0.92.

In the present embodiment, the angle θ which defines the outer circumferential top M1 of the magnet burying hole 34 of the rotor 14 is set to the relation:

$$0.65 < \Theta(=\theta/(180/P)) < 0.80$$

wherein P is the number of magnetic poles (number of poles) to be formed in the rotor core 24.

Furthermore, in the present embodiment, as shown in FIG. 1, when the rear depth of the slot 20 of the stator core 16 is D, and the burying depth of the permanent magnet 26 in the radial direction of the rotor core 24 is t, D/t=A is set to the relation:

$$0.8 < A < 1.1.$$

Thus, in the rotary electric machine 10 according to the present embodiment, the efficiency in the region R surrounded by a square in FIG. 3 can be obtained. Θ in FIG. 3 is described so that Θ=θ/(180/P). It is obvious that the amount of magnets is small and the efficiency and output are high in the region R.

Moreover, in the present embodiment, as shown in FIG. 2, the angle α between the straight line L1 connecting the center O of the rotor 14 to the middle position between two permanent magnets 26 arranged in the V shape, and a straight line L3 connecting the center O of the rotor 14 to an inner circumferential top M2 of one of the permanent magnets 26 is set to the relation:

$$\alpha > 2 \text{ degrees}.$$

Figure 5:
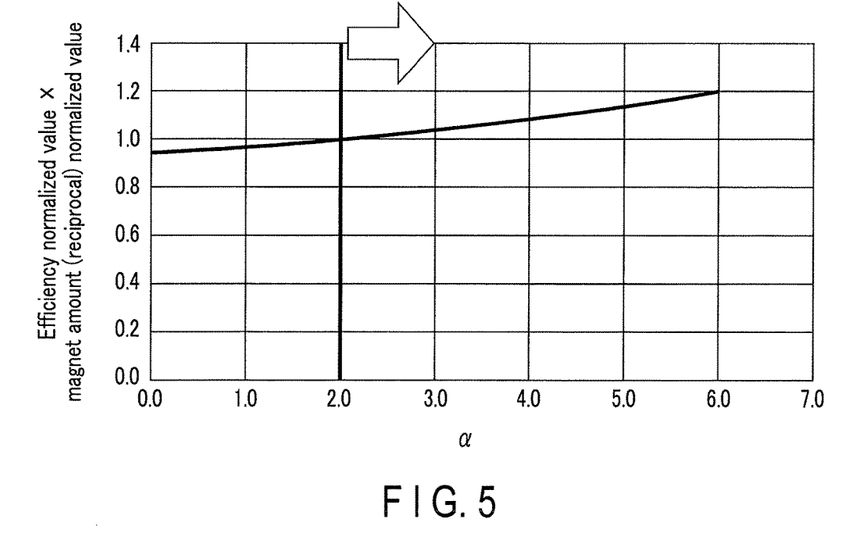
FIG. 5 is a characteristic diagram showing the relation between the value of the efficiency normalized value×a magnet amount (reciprocal) normalized value for the permanent magnet type rotary electric machine according to the first embodiment, and an angle α of an inner circumferential top of a permanent magnet.

FIG. 5 is a characteristic diagram in which the efficiency of the permanent magnet type rotary electric machine 10 according to the first embodiment and the magnet amount (reciprocal) of the rotor 14 are normalized, and the value of an efficiency normalized value×a magnet amount (reciprocal) normalized value is represented in comparison with α. In FIG. 5, in the region in which α>2 degrees, the value of the efficiency normalized value×the magnet amount (reciprocal) normalized value is 1.0 or more. Thus, according to the present embodiment, it is obvious that in this region, the magnet amount is small, and the efficiency and torque (output) are high.

Furthermore, in the present embodiment, as shown in FIG. 2, the following relation is set:

$$Th > Tm$$

wherein Th is the thickness of an inner circumferential insertion hole of the magnet burying hole 34 of the rotor 14, and Tm is the thickness of the permanent magnet 26.

Figure 6:
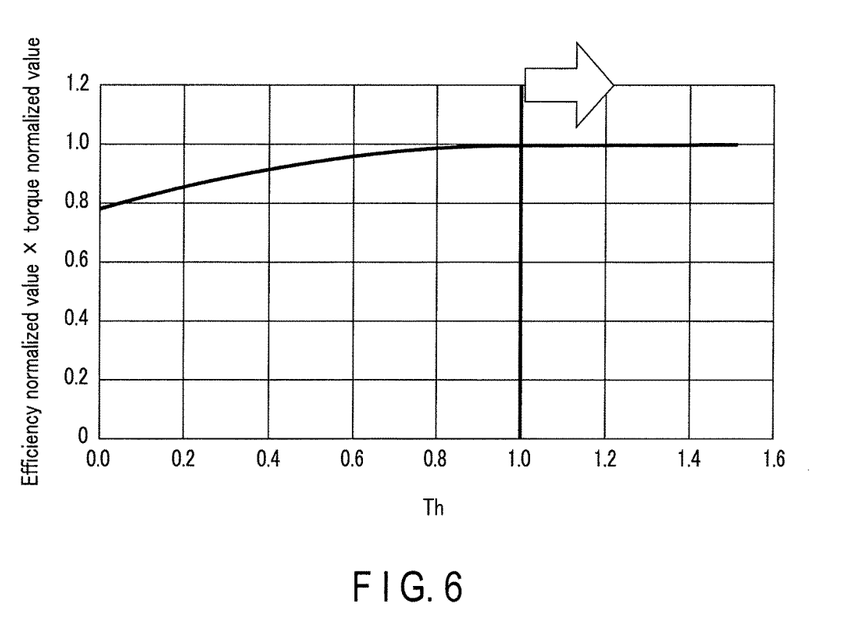
FIG. 6 is a characteristic diagram showing the relation between the value of the efficiency normalized value×the torque normalized value for the rotor of the permanent magnet type rotary electric machine according to the first embodiment, and a thickness Th of an inner circumferential insertion hole in a magnet burying hole.

FIG. 6 is a characteristic diagram showing the relation between the value of the efficiency normalized value×the torque normalized value for the rotor of the permanent magnet type rotary electric machine 10 according to the first embodiment, and the thickness Th of the inner circumferential insertion hole of the magnet burying hole 34 of the rotor 14. When the relation Th>Tm is set, the value of the efficiency normalized value×the torque normalized value of the rotary electric machine 10 is 1.0 or more, and it is possible to provide a region in which the magnet amount is small and in which the efficiency and torque (output) are high.

Moreover, in the present embodiment, as shown in FIG. 1, when the face width of the stator teeth 21 of the stator 12 is W1, and the width of the slot 20 of the stator 12 is W2, W1/W2=B is set to the following relation:

$$0.9 < B < 1.25.$$

Figure 4:
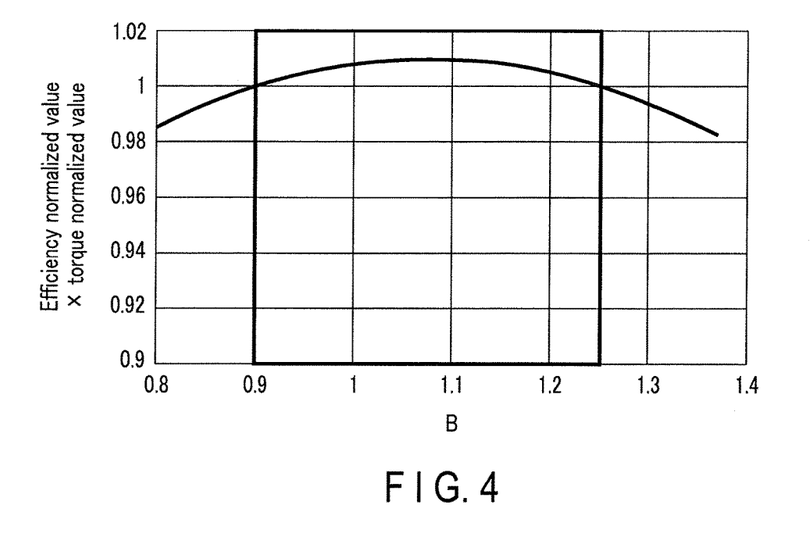
FIG. 4 is a characteristic diagram showing the relation between the value of the efficiency normalized value×the torque normalized value for the rotor of the permanent magnet type rotary electric machine according to the first embodiment, and a ratio B between a face width w1 and a slot width w2.

FIG. 4 is a characteristic diagram showing the relation between the value of the efficiency normalized value×the torque normalized value for the permanent magnet type rotary electric machine 10 according to the first embodiment, and a ratio B between the face width w1 of the stator teeth 21 and the slot width w2 of the slot 20 of the stator 12. As shown in FIG. 4, when the relation 0.9<B<1.25 is set, the value of the efficiency normalized value×the torque normalized value of the rotary electric machine 10 is 1.0 or more, and it is possible to provide a region in which the magnet amount is small and in which the efficiency and torque (output) are high.

As described above, according to the permanent magnet type rotary electric machine 10 in the first embodiment, the angle θ between the straight line L1 connecting the center O of the rotor 14 to the middle position between two permanent magnets 26 arranged in the V shape in the rotor 14, and the straight line L2 connecting the center O of the rotor 14 to the outer circumferential top M1 of one of the permanent magnets 26 satisfies the relation:

$$0.65 < \Theta(=\theta/(180/P)) < 0.80$$

wherein P is the number of poles in the rotor 14. When the rear depth of the slot 20 of the stator core 16 is D, and the burying depth of the permanent magnet 26 in the radial direction of the rotor core 24 is t, D/t=A satisfies the relation:

$$0.8 < A < 1.1.$$

Consequently, it is possible to provide a permanent magnet type rotary electric machine which reduces the amount of use of the permanent magnet 26 and also achieves higher efficiency (smaller loss).

This invention is not completely limited to the embodiment described above, and modifications of components can be made at the stage of carrying out the invention without departing from the spirit thereof. Further, various inventions can be made by properly combining the components disclosed in the embodiment described above. For example, some of all the components shown in the embodiment described above may be eliminated. Moreover, the components in different embodiments may be properly combined.

For example, the permanent magnet type rotary electric machine is not limited to the inner rotor type and may be an outer rotor type. The number of magnetic poles, dimensions, shape, and others of the rotor are not limited to the embodiment described above, and can be modified in various manners suitably to designs.

According to the this embodiment, it is possible to provide a permanent magnet type rotary electric machine which reduces the amount of use of the permanent magnet and also achieves higher efficiency (smaller loss).

REFERENCE SIGNS LIST

10: rotary electric machine, 12: stator, 14: rotor, 16: stator core, 20: slot: 22: rotation shaft, 24: rotor core, 26: permanent magnet, O: center, 34: magnet burying hole, L1 and L2: straight lines, M1: outer circumferential top, θ: angle, D: rear depth of the slot, t: burying depth of the permanent magnet.

What is claimed is:

1. A permanent magnet type rotary electric machine comprising:
   a stator having an armature coil;
   a rotor which is rotatably provided inside the stator and which has a rotor core; and
   permanent magnets arranged in a V shape in the rotor core to counteract a magnetic flux from the armature coil which passes between adjacent magnetic poles of the rotor,
   wherein an angle θ between a straight line connecting the center of the rotor to a middle position between two permanent magnets arranged in the V shape, and a straight line connecting the center of the rotor to an outer circumferential top of one of the permanent magnets has the relation:

$$0.65<\Theta(=\theta/(180/P))<0.80$$

in which P is the number of poles in the rotor,
the number of poles in the rotor is 6,
when a rear depth of a slot of the stator core is D, and a burying depth of the permanent magnet in the radial direction of the rotor core is t, D/t=A has the relation:

$$0.8<A<1.1, \text{ and}$$

the number of slots of the stator core is a multiple of 18.

2. The permanent magnet type rotary electric machine of claim 1, wherein an angle α between the straight line connecting the center of the rotor to the middle position between the two permanent magnets arranged in the V shape in the rotor, and a straight line connecting the center of the rotor to an inner circumferential top of one of the permanent magnets has the relation:

α>2 degrees.

3. The permanent magnet type rotary electric machine of claim 1 or claim 2, wherein Th>Tm in which Th is the thickness of an inner circumferential insertion hole in a magnet burying hole of the rotor to bury the permanent magnet, and Tm is the thickness of the permanent magnet.

4. The permanent magnet type rotary electric machine of claim 1 or claim 2, wherein when the face width of stator teeth of the stator is W1, and the width of the slot is W2, W1/W2=B has the relation:

$$0.9<B<1.25.$$

5. The permanent magnet type rotary electric machine of claim 3, wherein when the face width of stator teeth of the stator is W1, and the width of the slot is W2, W1/W2=B has the relation:

$$0.9<B<1.25.$$

* * * * *